United States Patent
Han et al.

(10) Patent No.: US 12,479,279 B2
(45) Date of Patent: Nov. 25, 2025

(54) ROOF SIDE RAIL FOR VEHICLES

(71) Applicants: HYUNDAI MOTOR COMPANY, Seoul (KR); KIA CORPORATION, Seoul (KR); HYUNDAI STEEL COMPANY, Incheon (KR)

(72) Inventors: Yoon-Kyoung Han, Hwaseong-si (KR); Min-Soo Kim, Hwaseong-si (KR); Hyung-Sik Choi, Hwaseong-si (KR); Byeong-Gi Yoo, Hwaseong-si (KR); Yeon-Jung Hwang, Hwaseong-si (KR); Joong-Hyun Shin, Hwaseong-si (KR); Won-Hee Cho, Hwaseong-si (KR); Jin-Chul Yang, Hwaseong-si (KR); Dong-Hyun Kim, Hwaseong-si (KR); Ji-Yun Cha, Yangsan-si (KR); Uk Heo, Incheon (KR)

(73) Assignees: HYUNDAI MOTOR COMPANY, Seoul (KR); KIA CORPORATION, Seoul (KR); HYUNDIA MOTOR COMPANY, Incheon (KR)

( * ) Notice: Subject to any disclaimer, the term of this patent is extended or adjusted under 35 U.S.C. 154(b) by 0 days.

(21) Appl. No.: 18/959,032

(22) Filed: Nov. 25, 2024

(65) Prior Publication Data
US 2025/0256556 A1     Aug. 14, 2025

(30) Foreign Application Priority Data
Feb. 13, 2024   (KR) .................. 10-2024-0020495

(51) Int. Cl.
*B60J 10/90*     (2016.01)
*B60J 7/16*      (2006.01)
*B60R 21/214*    (2011.01)

(52) U.S. Cl.
CPC ............. *B60J 10/90* (2016.02); *B60J 7/1642* (2013.01); *B60R 21/214* (2013.01)

(58) Field of Classification Search
CPC ........ B60J 10/90; B60J 7/1642; B60R 21/214
See application file for complete search history.

(56) References Cited

U.S. PATENT DOCUMENTS

| 4,729,593 | A  | * | 3/1988 | Nisiguchi | B60J 10/90 296/213 |
| 9,669,790 | B2 | * | 6/2017 | Inami | B60R 13/025 |
| 10,035,408 | B2 | * | 7/2018 | Crismon | B60J 7/11 |
| 10,538,216 | B2 | * | 1/2020 | White | B60R 21/213 |

(Continued)

FOREIGN PATENT DOCUMENTS

| JP | 2016112945 A | * | 6/2016 | ......... B60R 13/0206 |
| JP | 2021000982 A |   | 1/2021 | |

*Primary Examiner* — Drew J Brown
(74) *Attorney, Agent, or Firm* — Lempia Summerfield Katz LLC

(57) ABSTRACT

A roof side rail is positioned on a roof side of a vehicle along a longitudinal direction of the vehicle. The roof side rail includes a roof side outer panel formed with a cross-section projecting outward relative to the vehicle and a roof side inner panel formed with a cross-section projecting inward relative to the vehicle. Upper and lower portions of the roof side inner panel are respectively assembled with upper and lower portions of the roof side outer panel. A roof panel is removably mounted on the vehicle. When the roof panel is installed, the roof side outer panel supports the roof panel.

15 Claims, 9 Drawing Sheets

(56) References Cited

U.S. PATENT DOCUMENTS

| | | | |
|---|---|---|---|
| 11,390,236 B2* | 7/2022 | Tallapragada | B60R 21/04 |
| 11,999,219 B2* | 6/2024 | Young | B60J 1/085 |
| 2022/0258686 A1* | 8/2022 | Eddings | B60R 21/13 |

* cited by examiner

ROOF SIDE RAIL FOR VEHICLES

CROSS-REFERENCE TO RELATED APPLICATION

This application claims priority to Korean Patent Application No. 10-2024-0020495, filed on Feb. 13, 2024, and which is incorporated herein by reference in its entirety.

BACKGROUND

Field of the Disclosure

The present disclosure relates to a roof side rail for a vehicle that facilitates sealing around a perimeter of a roof panel of the vehicle with a removable roof panel.

Description of Related Art

The technology of opening a roof of a vehicle has been implemented in vehicles to provide an occupant with a greater sense of openness.

For example, as illustrated in FIGS. 1 and 2, in some vehicle models, the occupant may remove a roof panel 150 of a vehicle 100, allowing for driving the vehicle 100 with the roof open and experiencing an enhanced sense of openness. When the occupant manually removes the roof panel 150 of the vehicle 100, only frames such as a roof side rail 120 and a center rail 112 remain on the roof of the vehicle 100. As the roof panel 150 is removed, the occupant may experience the enhanced sense of openness.

Furthermore, a door 160 may also be removed in restricted driving environments to maximize the sense of openness.

In the case of the vehicle with the removable roof panel 150, the roof side rail 120 is manufactured by hot blow molding to reinforce rigidity of the roof of the vehicle 100, forming a cross-section of the roof side rail 120 as a closed cross-section.

In the case of the vehicle with the removable roof panel 150, the roof side rail 120 is formed with a closed cross-section to ensure a sturdy appearance and sufficient rigidity when the roof panel 150 is removed. The roof side rail 120 is formed with a tube-shaped closed cross-section by hot blow molding. However, for the roof side rail 120, which is formed with the closed cross-section, and lacks any projecting portions on an outer side thereof, it is not easy to install weatherstrips, i.e., weatherstripping, for sealing.

Accordingly, in some vehicle models, the weatherstrip is not applied between the roof side rail 120 and the roof panel 150. Instead, only a glass weatherstrip is applied to seal a top portion of a door glass. When the weatherstrip is not applied between the roof side rail 120 and the roof panel 150, sealing performance may be compromised when driving the vehicle with the roof panel 150 being re-installed. In addition, external noise may not be effectively blocked.

To address this problem, a carrier is additionally installed on the roof side rail 120, and a body weatherstrip is mounted on the carrier to seal the space between the roof side rail 120 and the roof panel 150. However, the installation of the carrier contributes to an increase in manufacturing and part costs.

Furthermore, even with the application of the body weatherstrip using the carrier, there is a limit in soundproof from outside noise.

SUMMARY

The present disclosure has been made to solve the problems mentioned above. An object of the present disclosure is to provide a roof side rail for a vehicle allowing for easy installation of weatherstrips on the vehicle with a removable roof panel.

To achieve the object, a roof side rail structure for a vehicle according to the present disclosure is provided. Such a roof side rail is positioned on roof sides of the vehicle along a longitudinal direction of the vehicle and may include a roof side outer panel formed with a cross-section projecting outward relative to the vehicle and a roof side inner panel formed with a cross-section projecting inward relative to the vehicle. Upper and lower portions of the roof side inner panel are respectively assembled with upper and lower portions of the roof side outer panel. A roof panel is removably mounted on the vehicle and, when the roof panel is installed on a roof of the vehicle, the roof side outer panel supports the roof panel.

An outer lower flange may be provided on a lower portion of the roof side outer panel facing toward a bottom of the vehicle. An inner lower flange may be provided on a lower portion of the roof side inner panel extending in the same direction as the outer lower flange. The outer lower flange and the inner lower flange may be assembled together such that the lower portions of the roof side outer panel and the roof side inner panel are assembled together.

A body weatherstrip may be fitted onto assembled outer lower flange and inner lower flange to seal a space between a door glass and the roof side rail.

The body weatherstrip may surround the outer lower flange and inner lower flange.

The body weatherstrip may be fitted along a perimeter of an area where a door is installed. An upper lip is installed on an outer side of the area where the body weatherstrip curves into a rounded shape providing support for the body weatherstrip.

The upper lip may support a lower end portion of a roof weatherstrip sealing around a perimeter of the roof panel.

The outer lower flange and the inner lower flange may be assembled together by spot welding.

An outer upper flange may be provided on an upper portion of the roof side outer panel, facing inward the vehicle. An inner upper flange may be provided on an upper portion of the roof side inner panel overlapping with the outer upper flange. The outer upper flange and the inner upper flange may be assembled together such that the upper portions of the roof side outer panel and the roof side inner panel are assembled together.

The outer upper flange and the inner upper flange may be provided to extend in opposite directions from each other.

A bottom surface of the outer upper flange may overlap with a top surface of the inner upper flange making contact with the respective surfaces thereof.

The outer upper flange and the inner upper flange may be assembled together by laser welding.

The lower portions of the roof side outer panel and the roof side inner panel may be assembled together at a more outward direction relative to the vehicle than the upper portions thereof.

The roof side outer panel and the roof side inner panel may be manufactured by hot stamping.

A trim piece may be provided to surround the roof side inner panel in an inward direction relative to the vehicle from the roof side inner panel.

The lower end portion of the trim piece may be positioned at a more outward position relative to the vehicle than the upper end portion of the trim.

The upper surface of the trim piece may be positioned above an area where the upper portions of the roof side outer panel and the roof side inner panel are assembled.

The lower end portion of the trim piece may be positioned at more inward direction of the vehicle than the inner lower flange, which extends toward a bottom of the vehicle at the lower portion of the roof side inner panel.

An airbag may be provided between the roof side inner panel and the trim.

According to the roof side rail for a vehicle of the present disclosure, with the configuration as described above, rigidity of the roof side rail may be easily improved. This is because the roof side outer panel and the roof side inner panel, processed from high-strength steel sheets such as hot-stamped steel, are assembled to form the roof side rail.

Furthermore, the weatherstrip may be fitted using the flanges for assembly of the roof side outer panel and roof side inner panel, thereby improving sealing performance without requiring additional components for applying the weatherstrip.

DESCRIPTION OF SPECIFIC EMBODIMENTS

Figure 1:
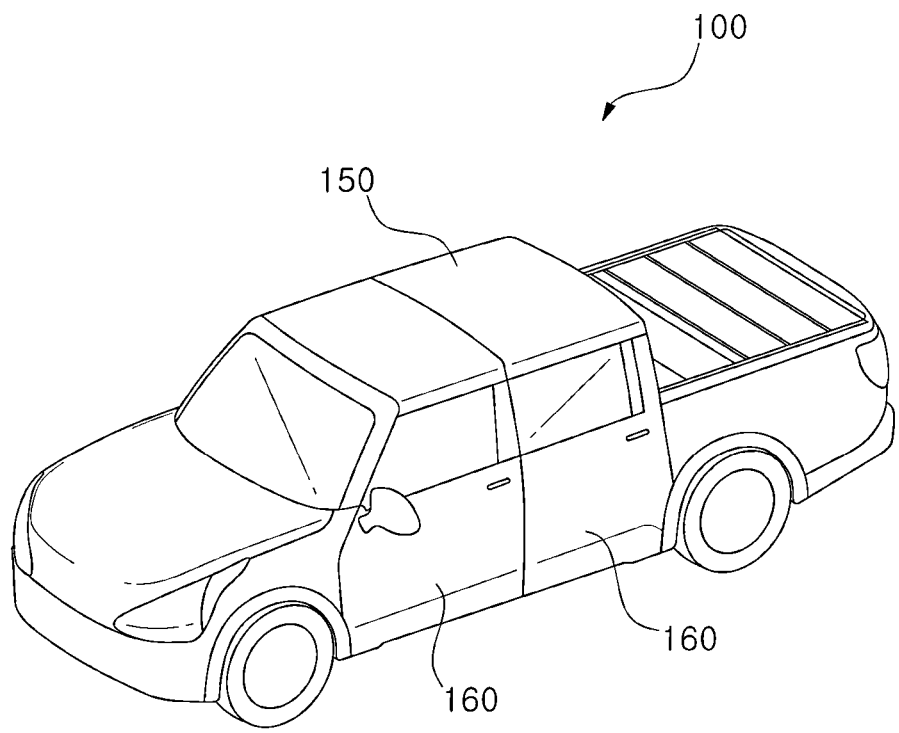
FIG. 1 is a schematic perspective view illustrating a vehicle with a roof side rail for a vehicle according to the related art.
Figure 2:
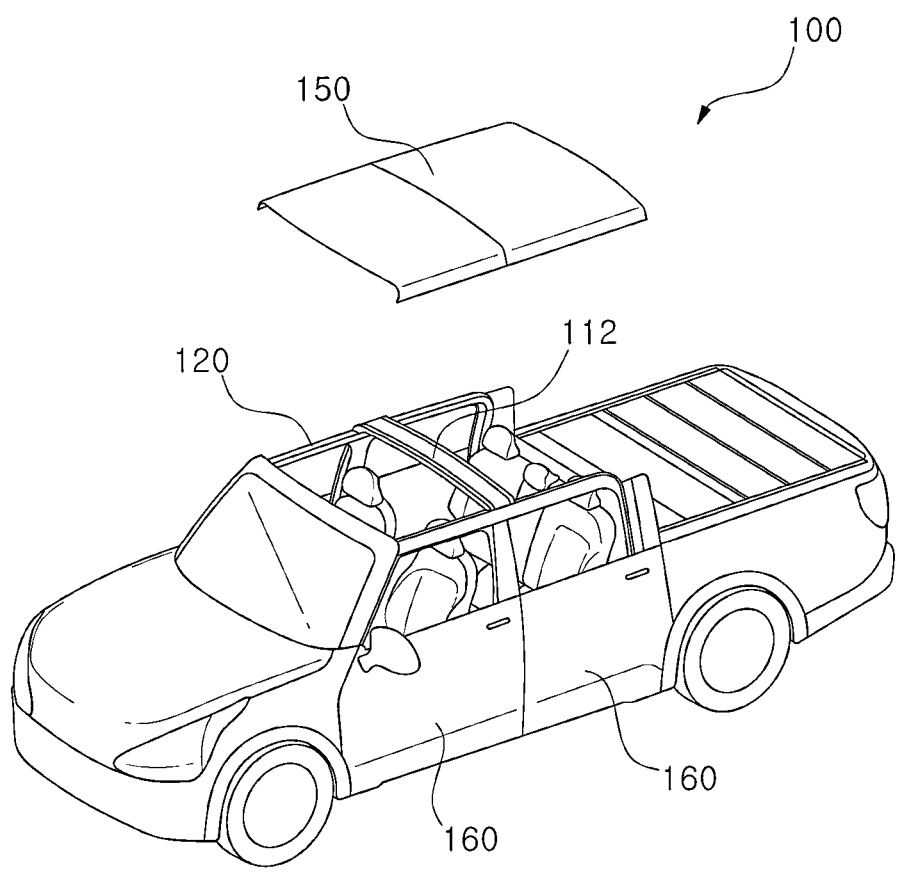
FIG. 2 is a schematic perspective view illustrating a state in which a roof panel is removed from the vehicle with the roof side rail for the vehicle according to the related art.
Figure 3:
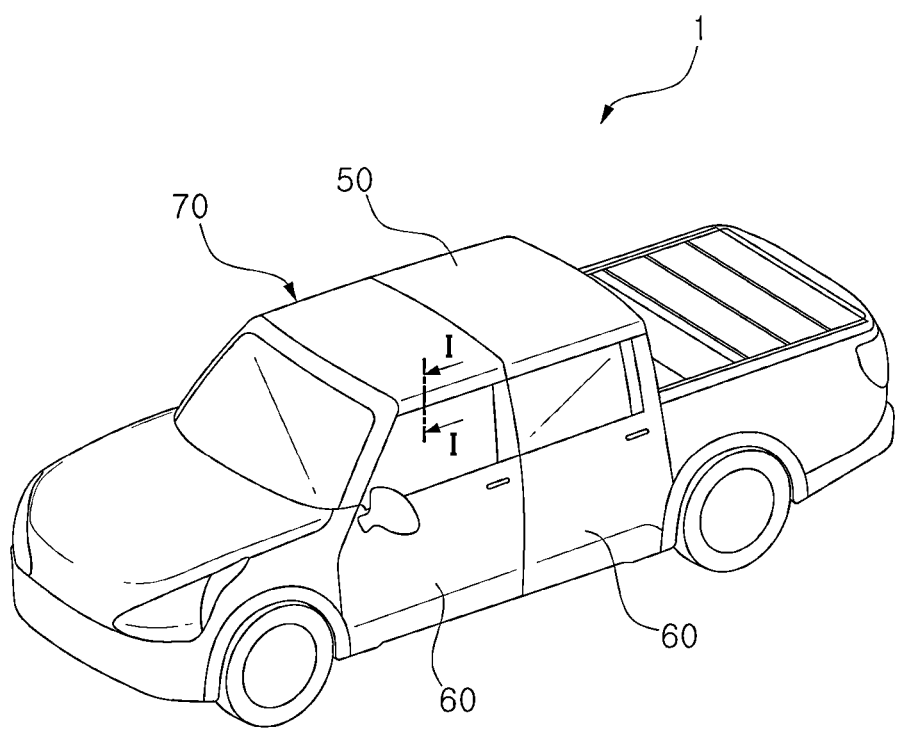
FIG. 3 is a schematic perspective view illustrating a vehicle with a roof side rail for a vehicle according to the present disclosure.
Figure 4:
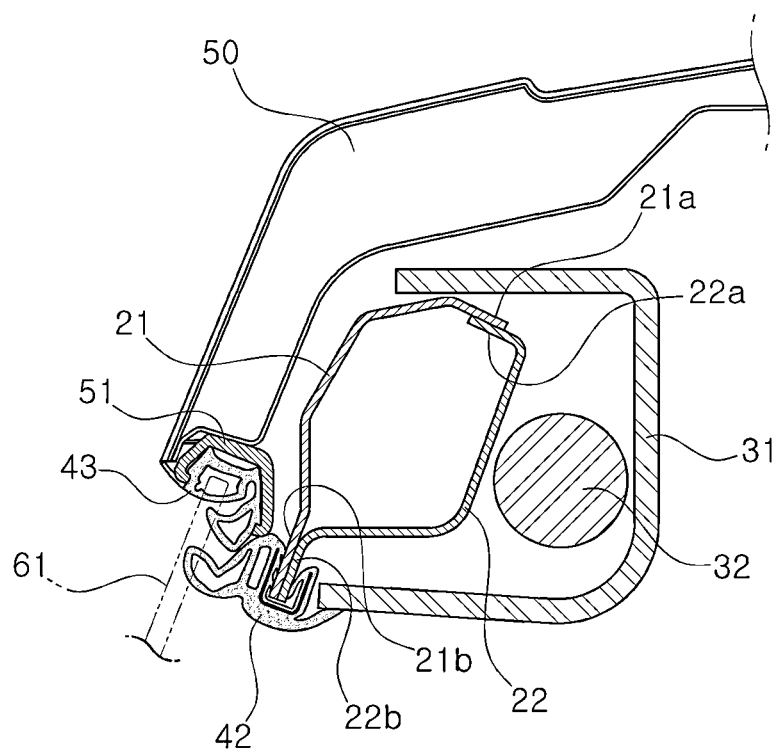
FIG. 4 is a cross-sectional view along line I-I in FIG. 3.
Figure 5:
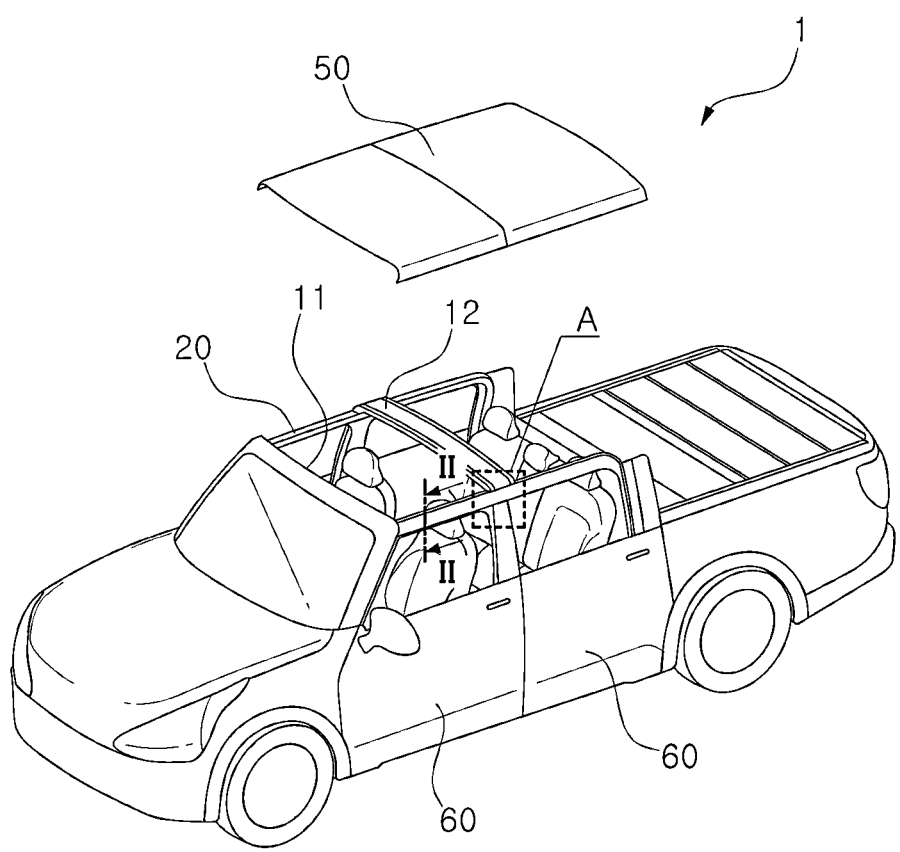
FIG. 5 is a perspective view illustrating a state in which a roof panel is removed from a vehicle with a roof side rail for a vehicle according to the present disclosure.
Figure 6:
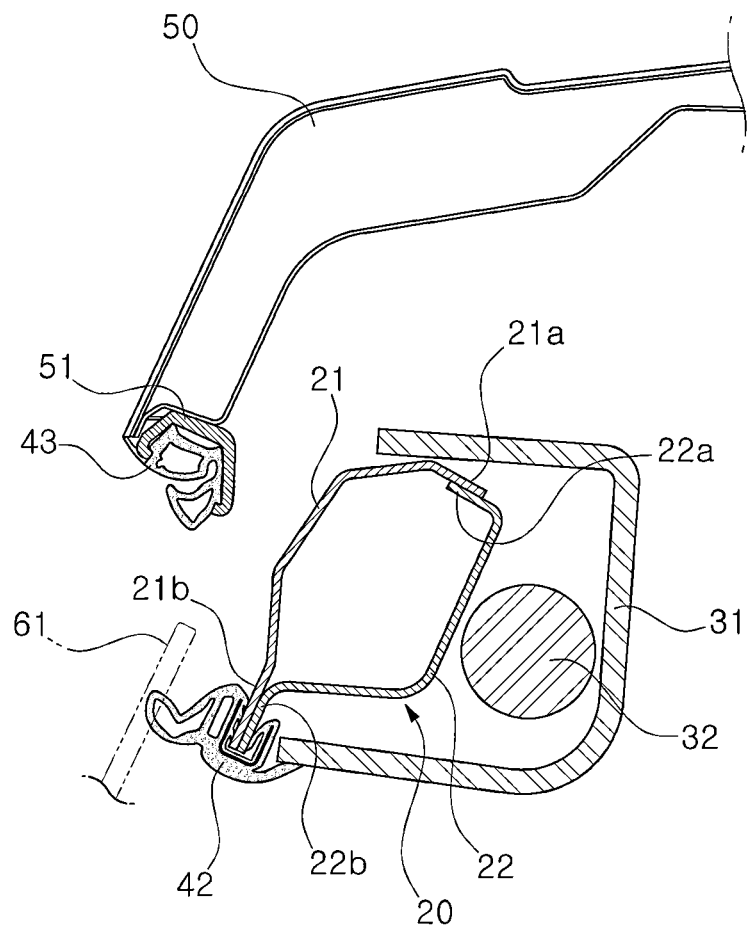
FIG. 6 is a cross-sectional view along line II-II in FIG. 5.
Figure 7:
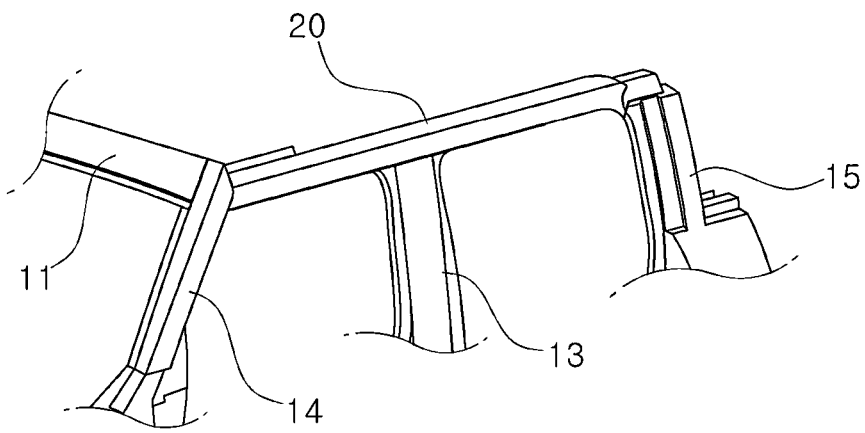
FIG. 7 is a perspective view illustrating a structure of an upper side of a vehicle with a roof side rail for a vehicle according to the present disclosure.

Hereinafter, a roof side rail for a vehicle according to the present disclosure is described in detail with reference to the accompanying drawings. When a component, device, element, or the like of the present disclosure is described as having a purpose or performing an operation, function, or the like, the component, device, or element should be considered herein as being "configured to" meet that purpose or perform that operation or function.

A roof side rail for a vehicle according to the present disclosure may be positioned on a roof side of a vehicle 1 along a longitudinal direction of the vehicle 1. Such a roof side rail may be provided on each side of the vehicle roof. Only one roof side rail may be mentioned below, but the description should be understood to include such a roof side rail on each side of the vehicle roof. A roof side rail 20 may include a roof side outer panel 21 and a roof side inner panel 22. The roof side outer panel 21 may be formed with a cross-section projecting outward in the vehicle 1. The roof side inner panel 22 may be formed with a cross-section projecting inward in the vehicle 1. Upper and lower portions of the roof side inner panel 22 may be respectively assembled with upper and lower portions of the roof side outer panel 21. A roof panel 50 may be removably mounted on the vehicle 1. When the roof panel 50 is installed, the roof side outer panel 21 may support the roof panel 50.

The roof side rail 20 according to the present disclosure may be applied to the vehicle 1 where the roof panel 50 is removably mounted from the vehicle 1.

The roof side rail 20 may be positioned on both side end portions of a roof 70 of the vehicle 1 along a longitudinal direction of the vehicle 1, supporting the side end portions of the roof panel 50 when the roof panel 50 is mounted.

A front rail 11 and the roof side rails 20 may be provided around the roof 70 of the vehicle 1, a center rail 12 may be provided in a width direction of the vehicle 1, and the roof panel 50 may be supported by the front rail 11, the roof side rail 20, and the center rail 12. Specifically, the front rail 11 may support a front end portion of the roof panel 50, the roof side rails 20 may respectively support both side end portions of the roof panel 50, and the center rail 12 may support a middle portion of the roof panel 50. A rear end portion of the roof panel 50 may be supported by rear pillars 15. The middle portion of the roof side rails 20 may be supported by center pillars 13. An area where the front rail 11 and the roof side rails 20 are connected may be supported by front pillars 14.

When the roof panel 50 is removed from the vehicle 1, the roof side rails 20 may be exposed to an outside of the vehicle 1, defining an appearance of the roof side end portions of the vehicle 1.

One roof side rail 20 is described below, though the description is applicable to the left and right roof side rails 20. The roof side rail 20 according to the present disclosure may include the roof side outer panel 21, which is formed with a cross-section projecting outward relative to the vehicle 1 and may include the roof side inner panel 22, which is assembled to the roof side outer panel 21. The roof side outer panel 21 and the roof side inner panel 22 may be assembled together, forming a closed cross-section.

The roof side outer panel 21 may be configured to project outward relative to the vehicle 1. The roof side outer panel 21 and the roof side inner panel 22 may be assembled together to form the closed cross-section. Thus, the roof side outer panel 21 may be configured to project outward relative to the vehicle 1.

The roof side outer panel 21 and the roof side inner panel 22 may be each manufactured by hot stamping. The roof side outer panel 21 and the roof side inner panel 22 may be each manufactured by hot stamping. Then the upper and lower portions may be assembled, respectively, thereby securing the same strength as when the roof side rail is manufactured by hot blowing.

The lower and upper portions of the roof side outer panel 21 may be provided with an outer lower flange 21b and an outer upper flange 21a, respectively, for assembly with the roof side inner panel 22.

The roof side inner panel 22 may be configured to project inward relative to the vehicle 1. As the roof side inner panel 22 is configured to project inward on the vehicle 1, the roof side outer panel 21 and the roof side inner panel 22 may be assembled together, forming the closed cross-section.

The lower and upper portions of the roof side inner panel 22 may also be provided with an inner lower flange 22b and an inner upper flange 22a, respectively.

By assembling the roof side outer panel 21 and the roof side inner panel 22 to form the roof side rail 20 with the closed cross-section, the roof side rail 20 may become a structure defining side end portions of the roof 70.

The outer lower flange 21b may be provided on the lower portion of the roof side outer panel 21, extending toward a bottom of the vehicle 1. The inner lower flange 22b may be provided on the lower portion of the roof side inner panel 22, extending in the same direction as the outer lower flange 21b.

The outer lower flange 21b and the inner lower flange 22b may be assembled together by welding or other suitable processes, leading to the assembly of the lower portions of the roof side outer panel 21 and the roof side inner panel 22. In one example, the outer lower flange 21b and the inner lower flange 22b may be assembled together by spot welding. In addition, the outer lower flange 21b and the inner lower flange 22b may be provided to be exposed at a bottom of the roof side rail 20, allowing for a direct fitting of a body weatherstrip 42 onto the assembled outer lower flange 21b and inner lower flange 22b. The exposure of the outer lower flange 21b and inner lower flange 22b may facilitate spot welding on both flanges using a welding gun and thus may enable easy fitting of the body weatherstrip 42 onto the assembled flanges.

When the door glass 61, which is provided on the door of the vehicle 1, may be maximally raised, the body weatherstrip 42 may seal a space between the roof side rail 20 and a top portion of an inner side of the door glass 61. Conventionally, a roof side rail may be manufactured by hot blowing, making it difficult to fit the body weatherstrip 42 onto the roof side rail. Therefore, it is necessary either not to apply a body weatherstrip 42 or to additionally install a carrier for fitting the body weatherstrip 42. However, the outer lower flange 21b and the inner lower flange 22b may be assembled together in an exposed state at the bottom of the roof side rail 20, allowing for the direct fitting of the body weatherstrip 42 onto the assembled outer lower flange 21b and inner lower flange 22b. During fitting, the body weatherstrip 42 may surround the outer lower flange 21b and the inner lower flange 22b. When the body weatherstrip 42 is fully fitted, the outer lower flange 21b and the inner lower flange 22b may not be visible from the outside of the vehicle 1.

The upper portions of the roof side outer panel 21 and the roof side inner panel 22 may be assembled with the outer upper flange 21a and the inner upper flange 22a, respectively.

The outer upper flange 21a may be provided on an upper portion of the roof side outer panel 21, extending inward relative to the vehicle 1.

On the other hand, the inner upper flange 22a may be provided on an upper portion of the roof side inner panel 22, overlapping with the outer upper flange 21a.

By assembling the outer upper flange 21a and the inner upper flange 22a in an overlapping state, the upper portions of the roof side outer 21 and the roof side inner 22 may be assembled.

In this case, the inner upper flange 22a may be provided to extend in an opposite direction to the outer upper flange 21a. As the outer upper flange 21a extends inward in the vehicle 1, the inner upper flange 22a may extend outward in the vehicle 1.

In addition, the bottom surface of the outer upper flange 21a may overlap with the top surface of the inner upper flange 22a, making contact with the respective surfaces, i.e., so that their respective surfaces are in contact with one another.

Thus, the outer upper flange 21a and the inner upper flange 22a may be assembled together in a direction unrelated to collisions.

The outer upper flange 21a and the inner upper flange 22a may be assembled by welding, such as by laser welding, to ensure that welded joints are not exposed outside the vehicle 1. The laser welding, which minimizes deformation of welded joints due to low heat generation, may be advantageous for assembling the outer upper flange 21a and the inner upper flange 22a, which overlap while facing in opposite directions. Specifically, laser welding with steel filler wires may be advantageous for better gap tolerance, weld strength, and appearance quality.

The roof side outer panel 21 and the roof side inner panel 22 may be formed such that the lower portion thereof, rather than the upper portion thereof, is assembled at a more outward position relative to the vehicle 1.

In other words, the outer lower flange 21b on the roof side outer panel 21 may be positioned farther outward on the vehicle 1 than the outer upper flange 21a. Similarly, the inner lower flange 22b on the roof side inner panel 22 may be positioned farther outward on the vehicle 1 than the inner upper flange 22a.

A trim piece 31 may be provided to surround the roof side inner panel 22, facing inward from the roof side inner panel 22 relative to the vehicle 1.

The trim piece 31 may surround the roof side inner panel 22, defining the inner appearance of the roof side rail 20.

The trim piece 31 may be positioned above an assembled area of the outer upper flange 21a and inner upper flange 22a, thereby ensuring that the assembled upper portions of the roof side outer panel 21 and the roof side inner panel 22 may not be exposed to outside the vehicle 1.

The lower end portion of the trim piece 31 may be positioned farther inward on the vehicle 1 than the inner lower flange 22b. In addition, as described above, the assembled lower portions of the roof side outer panel 21 and the roof side inner panel 22 may be exposed outside the vehicle 1, allowing for fitting of the body weatherstrip 42.

The lower end portion of the trim piece 31 may be positioned farther outward on the vehicle 1 than an upper end portion of the trim 31. This may be because the lower portion of the roof side inner panel 22 is also positioned farther outward on the vehicle 1 than the upper portion of the roof side inner panel 22.

An outer appearance of the roof side rail 20 may be defined by the roof side outer panel 21 when the roof panel 50 is removed.

An airbag 32 may be provided between the roof side inner panel 22 and the trim piece 31. The airbag 32, deployed during a side collision, may be provided in a space between the roof side inner panel 22 and the trim piece 31 to protect occupants in the event of a collision.

The roof panel 50 may be removable. When the roof panel 50 is mounted, a glass weatherstrip 43 may be fitted onto a weatherstrip holder 51 provided on a side end portion of the roof panel 50, ensuring that the glass weatherstrip 43 seals against the top of the door glass 61. The upper inner side of the door glass 61 may also seal against the body weatherstrip 42.

Figure 8:
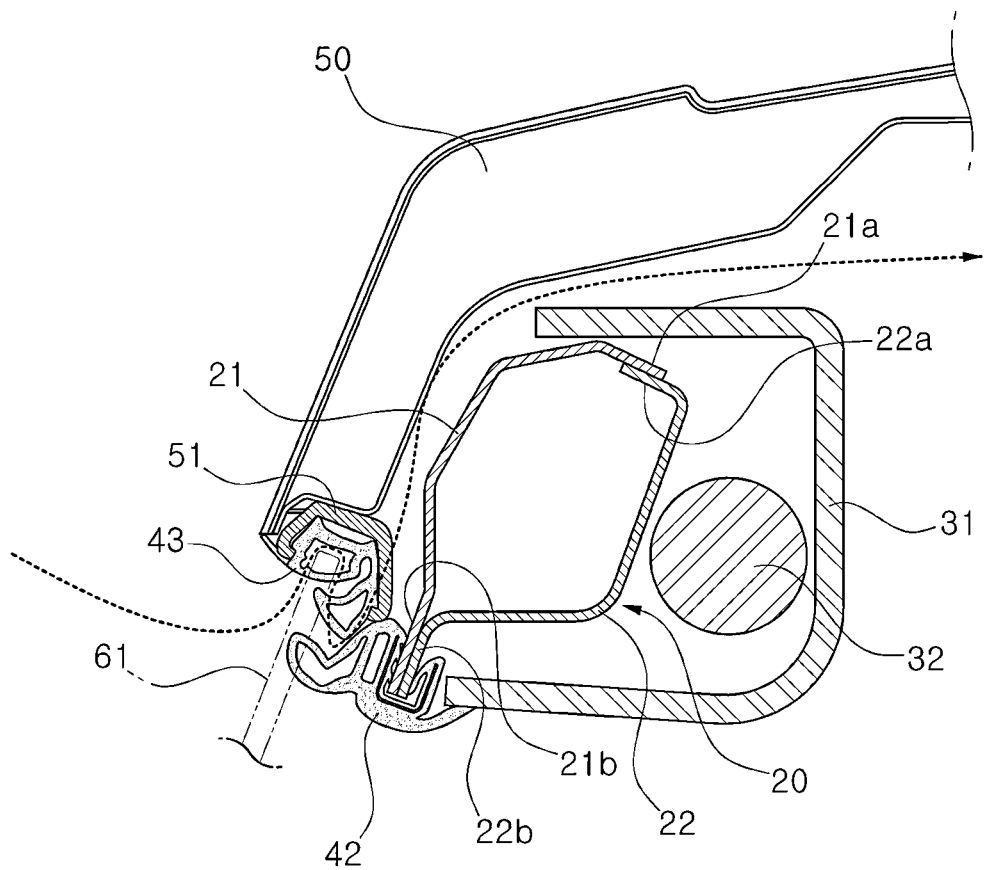
FIG. 8 is a cross-sectional view illustrating a pathway through which external noise enters a vehicle with a roof side rail for a vehicle according to the present disclosure.
Figure 9:
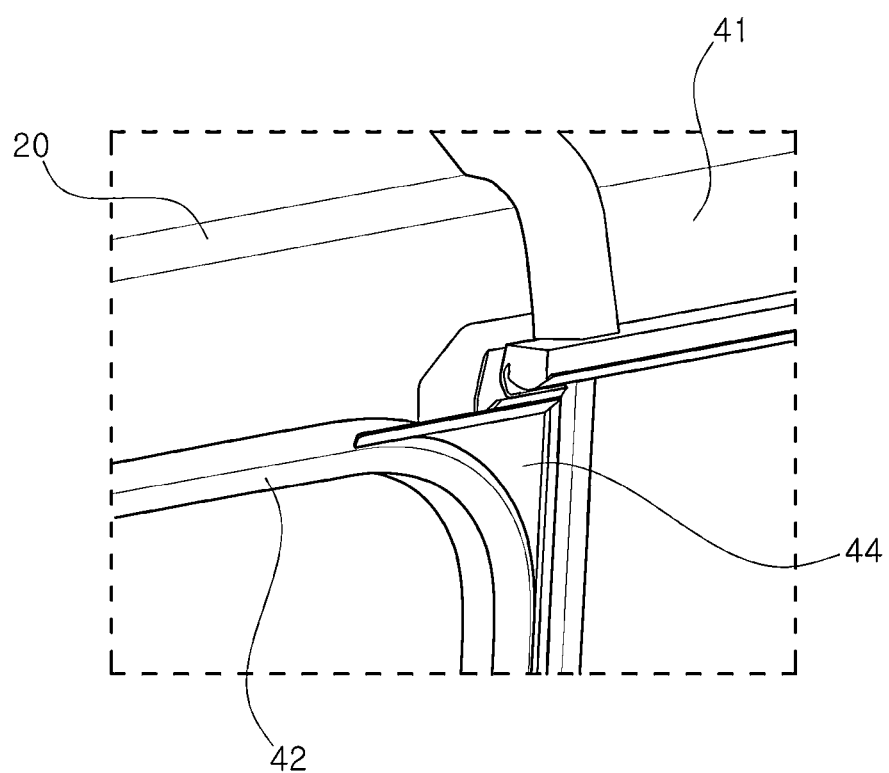
FIG. 9 and FIG. 10 are an enlarged main-portion perspective view and a cross-sectional view, respectively, illustrating an installation area on a body weatherstrip of a vehicle with a roof side rail for a vehicle according to the present disclosure.
Figure 10:
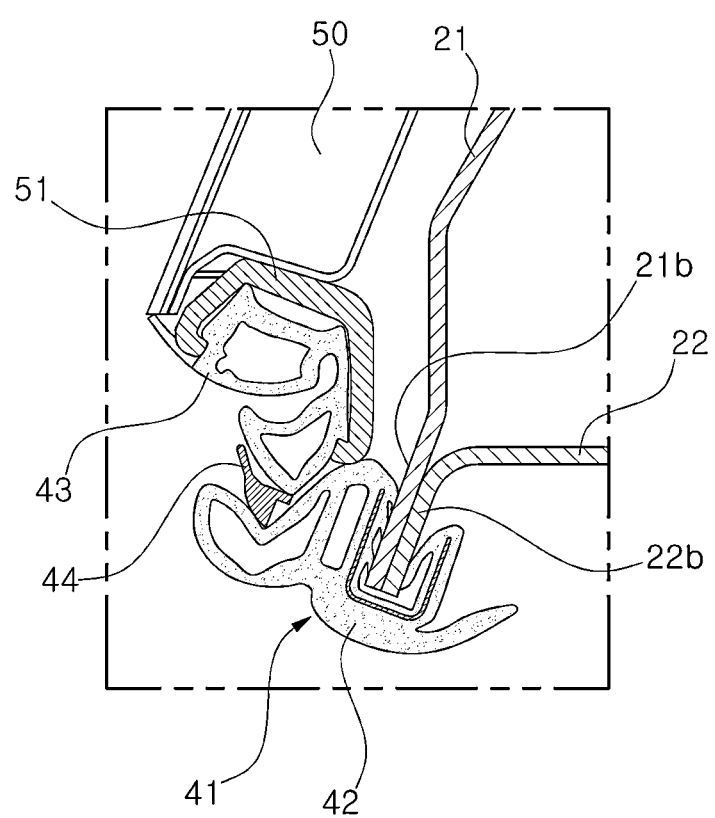

When the roof panel 50 is mounted, the space between the roof side rail 20 and the roof panel 50 may be double-sealed by the glass weatherstrip 43 and the body weatherstrip 42, significantly reducing wind noise caused by airflow between the roof panel 50 and the roof side rail 20 while the vehicle 1 travels. FIG. 8 illustrates a pathway through which wind noise may enter. The wind noise may be primarily blocked by the glass weatherstrip 43 and secondarily by the body weatherstrip 42. Specifically, as the wind noise passes the glass weatherstrip 43 and then bypasses the body weatherstrip 42 (see dotted line in FIG. 8), a length of the pathway may increase, resulting in a better soundproof structure.

When the roof panel 50 is removed, the upper inner surface of the door glass 61 may come into contact with the body weatherstrip 42, sealing the space between the roof side rail 20 and the top of the door glass 61, thereby supporting a top portion of the door glass 61.

When the roof panel 50 is mounted on the roof, the roof panel 50 may also be sealed by a roof weatherstrip 41 fitted onto the front rail 11 and the center rail 12. In this case, an upper lip 44 may be provided to support the roof weatherstrip 41.

The upper lip 44 may be installed on the outer side of an area where the body weatherstrip 42 curves into a rounded shape, providing support for the body weatherstrip 42. The upper lip 44 may support a rear surface of a curved portion of the body weatherstrip 42, which is fitted along a perimeter of the door 60 installation area, while also supporting the roof weatherstrip 41 to prevent the roof weatherstrip 41 from sagging.

The present disclosure has been described with reference to the example embodiments and the drawings, but the present disclosure is not limited thereby. The present disclosure may be carried out in various forms by those having ordinary skill in the art, to which the present disclosure pertains, within the technical spirit of the present disclosure and the scope of equivalents to the appended claims.

What is claimed is:

1. A roof side rail positioned on a roof side of a vehicle along a longitudinal direction of the vehicle, the roof side rail comprising:
   a roof side outer panel formed with a cross-section projecting outward relative to the vehicle; and
   a roof side inner panel formed with a cross-section projecting inward relative to the vehicle,
   wherein upper and lower portions of the roof side inner panel are respectively assembled with upper and lower portions of the roof side outer panel,
   wherein a roof panel is removably mounted on the vehicle and, when the roof panel is installed on a roof of the vehicle, the roof side outer panel supports the roof panel,
   wherein an outer lower flange is provided on a lower portion of the roof side outer panel facing toward a bottom of the vehicle,
   wherein an inner lower flange is provided on a lower portion of the roof side inner panel extending in the same direction as the outer lower flange,
   wherein the outer lower flange and the inner lower flange are assembled together such that the lower portions of the roof side outer panel and the roof side inner panel are assembled together,
   wherein a body weatherstrip is fitted onto the assembled outer lower flange and inner lower flange to seal a space between a door glass and the roof side rail,
   wherein the body weatherstrip is fitted along a perimeter of an area where a door is installed, and
   wherein an upper lip is installed on an outer side of an area where the body weatherstrip curves into a rounded shape providing support for the body weatherstrip.

2. The roof side rail of claim 1, wherein the body weatherstrip surrounds the outer lower flange and the inner lower flange.

3. The roof side rail of claim 1, wherein the upper lip supports a lower end portion of a roof weatherstrip sealing around a perimeter of the roof panel.

4. The roof side rail of claim 1, wherein the outer lower flange and the inner lower flange are spot welded together.

5. A roof side rail positioned on a roof side of a vehicle along a longitudinal direction of the vehicle, the roof side rail comprising:
   a roof side outer panel formed with a cross-section projecting outward relative to the vehicle; and
   a roof side inner panel formed with a cross-section projecting inward relative to the vehicle,
   wherein upper and lower portions of the roof side inner panel are respectively assembled with upper and lower portions of the roof side outer panel,
   wherein a roof panel is removably mounted on the vehicle and, when the roof panel is installed on a roof of the vehicle, the roof side outer panel supports the roof panel
   wherein
      an outer upper flange is provided on an upper portion of the roof side outer panel facing inward relative to the vehicle,
      an inner upper flange is provided on an upper portion of the roof side inner panel overlapping with the outer upper flange, and
      the outer upper flange and the inner upper flange are assembled together such that the upper portions of the roof side outer panel and the roof side inner panel are assembled together, and
   wherein the outer upper flange and the inner upper flange extend in opposite directions from each other.

6. The roof side rail for vehicles of claim 5, wherein a bottom surface of the outer upper flange overlaps with a top surface of the inner upper flange, and wherein surfaces thereof contact one another.

7. The roof side rail for vehicles of claim 5, wherein the outer upper flange and the inner upper flange are laser welded together.

8. The roof side rail for vehicles of claim 1, wherein the lower portions of the roof side outer panel and the roof side inner panel are assembled at a position further outward relative to the vehicle than the upper portions thereof.

9. The roof side rail for vehicles of claim 1, wherein the roof side outer panel and the roof side inner panel are hot stamped.

10. The roof side rail for vehicles of claim 1, wherein a trim piece is provided to surround the roof side inner panel in an inward direction relative to the vehicle from the roof side inner panel.

11. The roof side rail for vehicles of claim 10, wherein a lower end portion of the trim piece is positioned further outward relative to the vehicle than an upper end portion of the trim piece.

12. The roof side rail for vehicles of claim 10, wherein an upper surface of the trim piece is positioned above an area where the upper portions of the roof side outer panel and the roof side inner panel are assembled.

13. The roof side rail for vehicles of claim 10, wherein a lower end portion of the trim piece is positioned further inward relative to the vehicle than an inner lower flange which extends toward a bottom of the vehicle at the lower portion of the roof side inner panel.

14. The roof side rail for vehicles of claim 10, wherein an airbag is provided between the roof side inner panel and the trim piece.

15. A roof side rail positioned on a roof side of a vehicle along a longitudinal direction of the vehicle, the roof side rail comprising:
- a roof side outer panel formed with a cross-section projecting outward relative to the vehicle; and
- a roof side inner panel formed with a cross-section projecting inward relative to the vehicle,
- wherein upper and lower portions of the roof side inner panel are respectively assembled with upper and lower portions of the roof side outer panel,
- wherein a roof panel is removably mounted on the vehicle and, when the roof panel is installed on a roof of the vehicle, the roof side outer panel supports the roof panel,
- wherein a trim piece is provided to surround the roof side inner panel in an inward direction relative to the vehicle from the roof side inner panel, and
- wherein a lower end portion of the trim piece is positioned further inward relative to the vehicle than an inner lower flange which extends toward a bottom of the vehicle at the lower portion of the roof side inner panel.

\* \* \* \* \*